United States Patent [19]

Bakalar

[11] Patent Number: 4,778,632
[45] Date of Patent: * Oct. 18, 1988

[54] INJECTION MOLDING EQUIPMENT AND METHOD

[75] Inventor: Jerome Bakalar, Landerhill, Fla.

[73] Assignee: Neolens, Inc., Miami, Fla.

[*] Notice: The portion of the term of this patent subsequent to May 12, 2004 has been disclaimed.

[21] Appl. No.: 17,609

[22] Filed: Feb. 24, 1987

Related U.S. Application Data

[63] Continuation-in-part of Ser. No. 816,197, Jan. 6, 1986, Pat. No. 4,664,854.

[51] Int. Cl.$^4$ ............................................. B29D 11/00
[52] U.S. Cl. .................... 264/2.2; 264/40.5; 264/297.8; 264/328.7; 425/145; 425/149; 425/150; 425/447; 425/555; 425/562; 425/588; 425/808
[58] Field of Search ............. 264/2.2, 40.5, 297.8, 264/328.7; 425/808, 145, 149, 150, 447, 555, 562, 588

[56] References Cited

U.S. PATENT DOCUMENTS 4,184,835  1/1980  Talbot ............................... 425/808
4,364,878  12/1982  Laliferte et al. ..................... 264/2.2

FOREIGN PATENT DOCUMENTS 131429  7/1984  Japan ................................... 264/1.1

Primary Examiner—James Lowe
Attorney, Agent, or Firm—Cushman, Darby & Cushman

[57] ABSTRACT

A molding apparatus and method for producing a thermoplastic lens having a minimum of stress including a male mold and a female mold defining therebetween a molding space, one of the molds being mounted for movement towards and away from the other mold, and a gate mounted adjacent to the other mold for the passage of thermoplastic resin. The other mold defines a window width for admitting thermoplastic resin to the molding space. A compression pressure applying member such as a wedge-shaped slide member is further provided for moving the other mold toward and away from the one mold so as to compress thermoplastic resin within the molding space as well as to automatically withdraw the other mold from the one mold prior to the injection of thermoplastic resin.

18 Claims, 2 Drawing Sheets

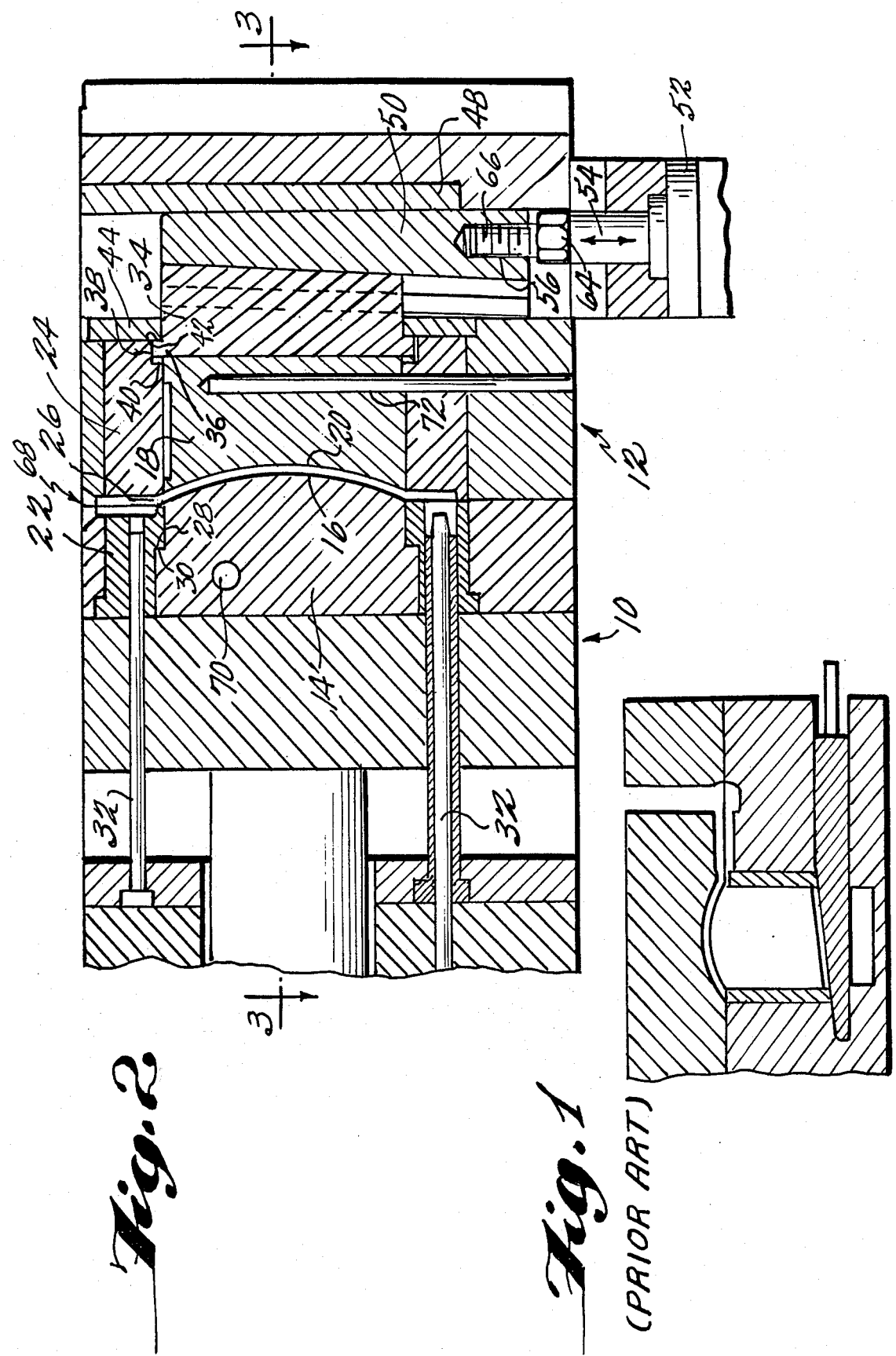

INJECTION MOLDING EQUIPMENT AND METHOD

This is a continuation-in-part of Ser. No. 06/816,197 filed Jan. 6, 1986, now U.S. Pat. No. 4,664,854.

BACKGROUND AND SUMMARY OF THE INVENTION

The present invention relates to the molding of thermoplastic lens blanks and the like and, more particularly, to a method and apparatus for molding one or more lens blanks of the same or different optical power from a polycarbonate resin so as to form lenses having a minimum of stress.

In the past, ophthalmic lenses, instrument lenses and small windows have been molded from thermoplastic material such as polycarbonate resin because products so formed are light weight, relatively inexpensive and virtually indestructible. Molded lenses present special problems, however, because in order to be commercially acceptable, lenses must be free of blemishes and distortions and have edge portions free from starring which can result in nonuniform setting of the thermoplastic material within a lens mold cavity.

My earlier U.S. patent application Ser. No. 816,197, filed Jan. 6, 1986, now U.S. Pat. No. 4,664,854 the disclosure of which is hereby incorporated by reference, is directed to a method and apparatus for producing a thermoplastic lens having a minimum of stress. More particularly, the molding apparatus disclosed therein includes a male mold and a female mold which define therebetween a molding space. The molds are mounted for movement toward and away from each other, and a gate is mounted adjacent to one of the molds for the passage of thermoplastic resin. This mold defines a window width for admitting thermoplastic resin to the molding space and floats away from the other mold in response to the admission of thermoplastic resin. A compression element operatively engages the floating mold and is movable from a home position to an end position so as to move the mold towards the other mold and to compress thermoplastic resin within the molding space. Finally, the home position of the compression element is adjustable to adjust the initial window width and, hence, balance thermoplastic resin fill speed and control the compression pressure applied to the thermoplastic resin within the molding space. In the preferred embodiment of this apparatus, the compression element is a wedge-shaped slide member and the gate includes a retainer ring member which surrounds the floating mold. A schematic representation of a molding apparatus of this type is shown in FIG. 1.

The present invention is directed to an improvement in the molding apparatus disclosed in my prior application. More particularly, it has been found that after the mold is repeatedly used, dust particles and other foreign substances can accumulate between the retainer ring and the free floating mold. This increases the friction between these elements so that the free floating mold does not move rearwardly as easily or as quickly when resin is injected. To overcome such initial inertia, the injection pressure of the thermoplastic resin of my prior apparatus must be increased. However, increasing injection pressure is undesirable for it can lead to an increase in stress in the lens formed at the molding station. Accordingly, the object of the present invention is to enable the "floating" or moving mold to be moved rearwardly automatically prior to the injection of thermoplastic resin. Thus, initial inertia need not be overcome and a smaller pressure of injection may be utilized.

Further, in a molding apparatus formed in accordance with my prior application, the retaining ring surrounding the floating mold must have a shape corresponding to the shape of the stationary mold because the stationary mold is larger than the floating mold. Accordingly, when the stationary mold is changed so as to provide a different curvature, it is also necessary to change the retainer ring.

In addition, it has been found that the fixed mold, the male mold in the preferred embodiment, needs to be changed more often than the female mold when forming various lenses. The need to repeatedly change the male mold necessitates the provision of a plurality of retainer rings of different curvatures.

Accordingly, it would be desirable to provide a retainer ring that need not be changed each time the curvature of the fixed mold is changed. A further desirable characteristic is a thermoplastic gate that is as large as possible so that the injected resin may flow as freely as possible to the molding space, limited only by the window width. Further, when higher powered lenses, i.e., thicker lenses, are formed with my earlier apparatus, the resultant edge angles are very small and may lead to high stress at the very edges. Thus, an apparatus which can make smaller diameter lenses with the same power thickness, will avoid undesirable stress at the edges.

Yet a further desirable feature is the provision of a device for independently controlling the speed for compacting and withdrawal of each of the hydraulic cylinders. With such control, each compression element will reach its home position and end position at the same time. Thus, compression can take place later for thicker lenses and pressure can be better controlled.

By way of improving my earlier invention, the present invention provides a molding apparatus which includes a male mold and a female mold defining therebetween a molding space. The molds are mounted for movement towards and away from each other. Further, a gate is mounted adjacent to at least one of the molds for passage of thermoplastic resin, that mold defining a window width with the gate for admitting thermoplastic resin to the molding space. A compression element is also provided for operatively engaging one of the molds and is movable from a home position to an end position so as to move the mold toward the other mold to compress thermoplastic resin within the molding space. In accordance with the present invention, the window defining mold is moved automatically to a maximum distance from the other mold prior to the injection of thermoplastic resin.

As in my prior invention the home position of the compression element is adjustable to adjust the window width and, hence, balance thermoplastic resin fill speed and control the compression pressure applied to thermoplastic resin within the molding space.

In the preferred embodiment of the present invention, the gate is formed by a retainer ring member which surrounds the movable, window defining mold and a retainer ring member which surrounds the other, stationary mold. Thus, the retainer ring surrounding the movable mold need not have a curvature matching the curvature of the stationary mold and, accordingly, the latter can be changed without necessitating changing the retainer ring. Further, the gate provided can be larger and thicker lenses may be formed without too sharp an edge angle.

Finally, in another preferred embodiment of the present invention, a valve controlled, for example, by a computer is provided in a line to each hydraulic cylinder so that compression can take place later for thicker lenses and all the compression elements or wedges reach their home positions and end positions at the same time. Thus, pressure can be controlled more precisely.

BRIEF DESCRIPTION OF THE DRAWINGS

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form part of this specification, wherein like reference numerals designate corresponding parts in the various figures and wherein:

FIG. 1 is a schematic cross-sectional view of a molding apparatus;

FIG. 2 is a cross-sectional view, partly broken away for clarity, of a molding apparatus formed in accordance with the present invention.

DETAILED DESCRIPTION OF THE PRESENTLY PREFERRED EXEMPLARY EMBODIMENT

Figure 3:
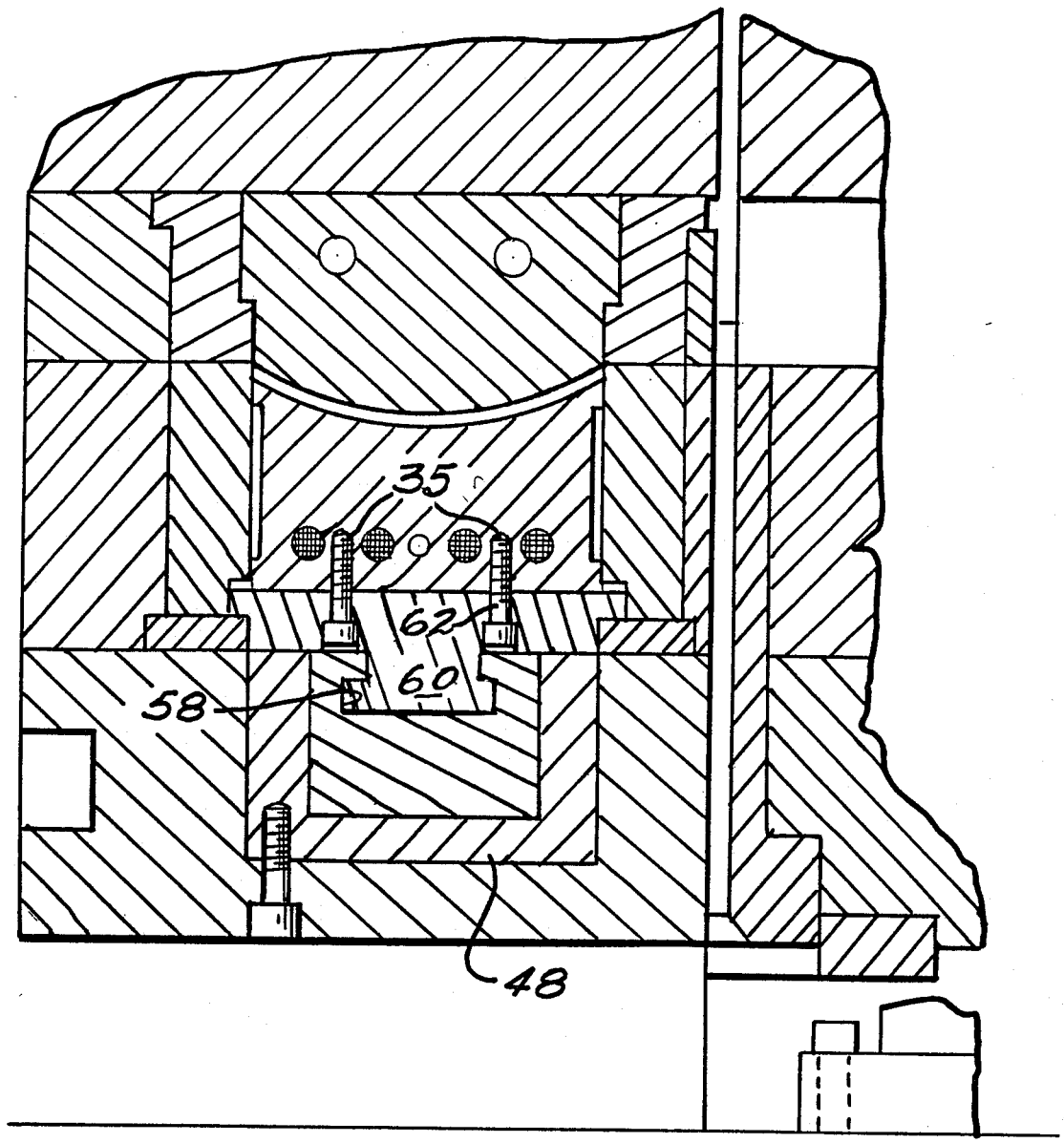
FIG. 3 is a cross-sectional view, partly broken away for clarity, taken along line 3—3 of FIG. 2.

Turning to FIG. 2, the molding apparatus of the present invention includes a frame having a movable frame portion 10 and a fixed frame portion 12. Movable frame portion 10 is horizontally movable from a clamping position (shown in FIG. 2) to an open, unloading position (not shown). Movable frame 10 supports a male mold 14 having a substantially convex molding surface 16 conforming to the curvature for one major surface of the lens to be molded. Male mold 14 is rigidly supported in frame 10 so that it is adjustable between a molding position, shown in FIG. 2, and an unloading position (not shown) by moving frame portion 10. A fixed frame portion 12 supports a female mold 18 having a concave molding surface 20 conforming to the curvature desired for the opposite major surface of the lens to be formed. A retainer ring 22 surrounds male mold 14 and is disposed symmetrically opposite a retainer ring 24 which surrounds female mold 18. Retainer ring 22 and retainer ring 24 define at one point about the molding space a gate means 26, as will be discussed more fully below.

As can be further seen in FIG. 2, retainer ring 22 includes a shoulder portion 28 which engages a corresponding shoulder portion 30 formed on male mold 14. An ejector 32 is also provided which extends through retainer ring 22 so that retainer ring 22 as well as male mold 14, through interaction of shoulders 28 and 30, can be moved in unison away from female mold 18 when a lens is to be removed from the molding station. With such a structure, the male mold 14 may be readily changed in accordance with the curvature of the desired lens by simply removing and replacing male mold 14, the engagement of shoulder 28 and shoulder 30 ensuring that the male mold is properly placed relative to the other parts of the mold. As is apparent, however, removing and changing the male mold in this manner requires no changes be made to the remaining mold structure such as retainer ring 24.

Female mold 18, on the other hand, is supported in sliding relation within retainer ring 24. More particularly, referring to FIGS. 2 and 3, an insert cap 34 is mounted to rearward end of female mold 18 by suitable means such as set screws 35. Insert cap 34 has a radial flange 36 extending circumferentially outward to fit within a circumferential recess 38 defined by retainer ring 24. Inward movement of cap 34 and, hence, mold 18 are limited by engagement of flange 36 and shoulder 40. Similarly, outward movement of cap 34 and mold 18 are limited by engagement of flange 36 with an outer shoulder 42 of recess 38 which is formed by a ring 44 secured to retainer ring 24 by suitable set screws, or the like.

The molding apparatus further includes a slide housing 48 fixed to fixed frame portion 12 and connected to the outer end of retainer ring 24. Housing 48 receives a wedge-shaped slide member 50 adapted to move axially horizontally therein. A hydraulic piston 52 is oriented horizontally with the outer end of its piston rod 54 secured to one end of wedge-shaped slide 50 in a threaded connection 56. Piston 52 is adapted to move slide 50 horizontally between a home or retracted position (not shown) and an operating or end position (shown in FIG. 2) in which slide member 50 displaces cap 34 and hence female mold 18 toward male mold 14.

Referring more particularly to FIG. 3, it can be seen that cap 34 and wedge-shaped slide 50 are slidably coupled by means of a T-shaped groove 58 formed in slide 50 and a T-shaped projection 60 formed on the outermost surface of cap 34. Further, as was stated above, cap 34 and female mold 18 are rigidly attached by, for example, set screws 38 provided in suitable apertures 61 and counterbores 62 defined in cap 34 and mold 18, respectively. As is apparent from the foregoing, when wedge-shaped slide 50 is moved horizontally outwardly relative to housing 48 to its home position, the sliding innerfitting relation of T-shaped projection 60 and T-shaped groove 58 pulls cap 34 and female mold 18, attached thereto, outwardly relative to male mold 14. Thus, when slide 50 is retracted to its home position immediately prior to the injection of thermoplastic resin into the molding cavity, female mold 18 is automatically moved away from male mold 14 so as to define a window width through which the thermoplastic resin delivered to the molding space is fed. Similarly, when hydraulic piston 52 is actuated, the horizontally inward movement of slide 50 causes cap 34 and female mold 18 to move towards male mold 14 so as to compress thermoplastic resin within the molding cavity, as will be discussed more fully below.

Referring again to FIG. 2, slide 50 of each molding station is individually adjustable in axial position relative to associated piston 52 to control its home position. Rotation of an adjustment nut 64 along an externally threaded shaft 66 determines the home position of slide 50. When slide 50 is adjusted so as to be relatively close to piston 52, its home position will be further horizontally outward relative to housing 48 than when slide 50 is adjusted so as to be displaced from piston 52. Accordingly, the window defined by mold 18, because of the interconnection of mold 18, cap 34 and slide 50, will have a greater maximum depth when slide 50 is adjusted to be closer to piston 52 than the maximum depth associated with a disposition further from piston 52. Thus, by adjusting the home position of slide 50, via adjustment nut 64, the window width defined by mold 18 can be adjusted.

Because gate 26 is larger than the window width defined by mold 18, the window width determines the resin fill speed. As is apparent, then, by adjusting the window width the resin fill speed can be controlled for the particular lens to be molded and, accordingly, a lens having a minimum of stress can be produced. Of course, another way to control the depth of the window is by replacing the wedge-shaped slide 50 with another slide member having a different wedge angle or a different thickness and replacing cap 34 with another cap with an outer face having an angle corresponding to the new slide member. Fine tuning of the maximum depth of the window results from rotation of the adjustment nut 64 and a greater change in maximum window depth results from changing the wedge-shaped slide member 50 and cap 34. As is apparent from the foregoing, the wedge-shaped slide members are readily changed or adjusted without removing the frame portion 12 from the apparatus.

In addition, insert cap 34 can have different positions at different molding stations by independently adjusting the initial position of the radial flange 36 of insert cap 34 relative to associated recess 38. Such variations in position define different amounts of overlap between female mold 18 and gate 26 to define the depth of the window at each gate 26 independently. The positioning of flange 36 relative to recess 38 of its associated retainer ring 24 whenever a female mold 18 is changed represents another way of independently adjusting the depth of window at any given molding station.

Each of the hydraulic pistons 52 is preferably coupled to a common manifold (not shown). In accordance with a preferred embodiment of the present invention, a valve is placed in line to each piston 52 from the common manifold. Further, a computer controls each of the valves so that speed for compacting and withdrawal on all wedge-shaped slides can be individually adjusted. In this manner, all of the slides in a given molding apparatus having multiple molding stations will reach their home position and their end positions at the same time. Thus, the molding process can be more closely regulated.

Conventional heating elements 70 and 72 are provided for molds 14 and 18, respectively, conventional water circulating heaters being preferred for mold 14. These controlled temperatures insure that the mold temperatures are optimum for the volume of resin injected in each cavity. The female mold is maintained between 195° and 250° F. and the male mold is maintained between 140° and 170° F. for producing lens blanks have a normal thickness of 1.5 to 5 mm. The exact temperature selected, of course, depends on the thicknesses of lenses being produced at the various stations. Generally, the temperature of each male mold-female mold pair at each cavity will be individually adjusted regardless of the mass of resin in the cavity in order to balance the other adjustments.

As is apparent from the foregoing, the different slide members for different molding stations may move different distances depending on how far its associated female mold and cap member have been retracted when the wedge-shaped side is moved to its home position. Further, compressive forces are applied throughout the entire major surfaces of the charges in the direction of the thickness in all of the cavities regardless of the volume of resin injected therein. In addition, a substantially uniform pressure is applied to material in each of the cavities which is sufficiently high to insure that all of the lens blanks olded have a minimum of stress established during the molding operation.

The molding apparatus of the present invention operates as follows:

Initially, piston 52 is actuated and slide member 50 is retracted to its home position, simultaneously pulling cap 34 and female mold 18 to their maximum spacing from male mold 14, thus, determining the window width for the admission of the thermoplastic resin to that particular mold cavity. After the slide member has been fully retracted, thermoplastic is injected through a sprue (not shown), a runner 68, gate 26, the window and into the mold cavity. After the initial surge of high pressure injection filling has ended, hydraulic cylinders or pistons 52 are actuated in accordance with the actuation of its respective value and move the associated wedge-shaped slides toward their independent operating positions for each molding station to apply compression pressure to the resin in each mold cavity. Inward slide movement stops when increasing compression pressure equals decreasing injection pressure. As hydraulic pressure continues to rise and injection pressure falls to zero, slide 50 applies force through cap 34 and female mold 18 to the injected resin until movable frame 10 begins to retract mold 14 and the molded lens is ejected from the cavity. After completion of the compression pressure cycle, pistons 52 are retracted under a reverse pressure to move slide members 50 to their home positions for the next cycle and, accordingly, move female molds 18 again away from male molds 14.

While the invention has been described in connection with what is presently considered to be the most practical and preferred embodiment, it is to be understood that the invention is not to be limited to the disclosed embodiment, but on the contrary, is intended to cover various modifications on equivalent arrangements included within the spirit and scope of the appended claims.

What is claimed is:

1. An apparatus for molding a lens comprising:
   a male mold and a female mold defining therebetween a molding space;
   means mounting one of said molds for movement toward and away from the other mold;
   gate means mounted adjacent to said other mold and defining a gate for passage of thermoplastic resin;
   said other mold defining a window width for admitting thermoplastic resin to said molding space;
   compression means for operatively engaging the other mold and movable from a home position to an end position to move said other mold toward said one mold and to compress thermoplastic resin within said molding space;
   means for automatically withdrawing said other mold to a maximum distance from said one mold prior to the injection of thermoplastic resin; and
   means for adjusting the home position of said compression means to adjust the window width so as to balance thermoplastic resin fill speed and control the compression pressure applied to thermoplastic resin within said molding space.

2. An apparatus as in claim 1, wherein said compression means comprises a wedge-shaped slide member, the home position of said slide member defining said maximum distance said other mold may be spaced from said one mold, said slide member being operatively coupled to said other mold so as to automatically withdraw said other mold to said maximum distance when said slide member moves to said home position.

3. An apparatus as in claim 1, wherein said compression means is operatively coupled to said other mold so that said other mold is automatically withdrawn to said maximum distance when said compression means moves to said home position.

4. An apparatus as in claim 1, wherein said gate means comprises a first retainer ring member surrounding said other mold and a second retainer ring member surrounding said one mold; said first retainer ring member limiting movement of said other mold and stationing said other mold relative to said one mold so that a portion of said other mold overlaps a portion of the width of said gate means so that said window width is less than the width of said gate means to thereby control the rate of injection of molten resin.

5. An apparatus as in claim 2, wherein said gate means comprises a first retainer ring member surrounding said other mold and a second retainer ring member surrounding said one mold; said first retainer ring member limiting movement of said other mold and stationing said other mold relative to said one mold so that a portion of said other mold overlaps a portion of the width of said gate means so that said window width is less than the width of said gate means to thereby control the rate of injection of molten resin.

6. An apparatus as claimed in claim 1, further comprising a hydraulic piston for moving said compression means from said home position to said end position.

7. An apparatus as claimed in claim 6, wherein said means for adjusting comprises an adjustment nut element disposed on a threaded shaft interconnecting said hydraulic piston and said compression means.

8. An apparatus as in claim 2, further comprising a cap element mounted to an outermost end of said other mold relative to said molding space; said cap element including a T-shaped projection on an outermost surface thereof relative to said other mold; said wedge-shaped slide member including a T-shaped groove, said T-shaped projection being disposed within and in sliding engagement with said T-shaped groove such that when said slide member is moved to said home position, said sliding relation of said T-shaped projection and T-shaped groove causes said cap element and said other mold, coupled thereto, to be withdrawn to said maximum distance thereby defining said window width.

9. An apparatus as in claim 5, further comprising a cap element mounted to an outermost end of said other mold relative to said molding space; said cap element including a T-shaped projection on an outermost surface thereof relative to said other mold; said wedge-shaped slide member including a T-shaped groove, said T-shaped projection being disposed in and in sliding relation to said T-shaped groove such that when said slide member is moved to said home position, said sliding relation of said T-shaped projection and T-shaped groove causes said cap element and said other mold, coupled thereto, to be withdrawn to said maximum distance so as to define said window width.

10. A method of molding a lens comprising:
placing a male mold and a female mold in facing relation so as to define therebetween a molding space;
mounting one of said molds for movement toward and away from the other mold;
mounting gate means adjacent said other mold for providing a passage for thermoplastic resin; said other mold defining a window width for admitting thermoplastic resin to said molding space;
operatively engaging said other mold with compression means movable from a home position to an end position such that when said compression means is retracted to said home position, said other mold is automatically withdrawn to a maximum distance from the one mold and when said compression means is moved to said end position, said other mold is moved toward said one mold to compress thermoplastic resin in said molding space;
adjusting the home position of said compression means so as to define said maximum distance said other mold can be displaced so as to adjust the window width to thereby balance thermoplastic resin fill speed and compression pressure applied to thermoplastic resin within said molding space;
retracting said compression means to said home position and simultaneously withdrawing said other mold from said one mold to said maximum distance;
delivering molten plastic resin under pressure to said molding space;
reducing said injection pressure while moving said compression means so as to apply pressure to said other mold;
continuing to apply pressure so as to compress said resin within said molding space to form a lens blank;
moving said one mold away from said other mold to provide access to said lens blank; and
removing said lens blank from said molding space.

11. A method as claimed in claim 10, wherein said step of mounting gate means comprises enclosing said other mold within a first retainer ring element and enclosing said one mold within a second retainer ring element, said first and second retainer ring elements defining said gate means; said first retainer ring element limiting movement of said other mold and stationing said other mold relative to said one mold so that a portion of said other mold overlaps a portion of the width of said gate means so as to form a window of less width than said gate means to thereby control the rate of injection of molten resin.

12. A method as claimed in claim 10, wherein said step of operatively engaging said other mold with compression means comprises operatively engaging said other mold with a wedge-shaped slide member.

13. A method as claimed in claim 11, wherein said step of adjusting the home position of said compression means comprises selecting a home position so as to define a maximum distance which does not exceed the width of said gate means.

14. A method as claimed in claim 10, further comprising continuing to apply said pressure against said lens blank until said step of moving said one mold away from said other mold.

15. A method as claimed in claim 10, wherein said step of moving said compression means comprises applying pressure to a hydraulic piston which actuates said compression means to move.

16. A method as claimed in claim 12, wherein said step of moving said compression means comprises applying pressure to a hydraulic piston which actuates said slide member to move.

17. A method as claimed in claim 16, further comprising providing a plurality of said molding stations; said step of providing a wedge-shaped slide member including providing at least one of said molding stations with a wedge-shaped slide member having a different size than the other molding stations; said step of selecting a home position for said wedge-shaped slide member including selecting a home position for one of said said slide members that defines a different maximum distance than the other of said slide members; said step of delivering molten plastic resin including simultaneously delivering molten plastic resin under injection pressure from a single source to each of said molding stations; said step of moving said wedge-shaped slide member comprises applying pressure to each said hydraulic piston from a common manifold having a maximum pressure and controlling the pressure to each said hydraulic piston with valve means provided in line to each said piston;

whereby, a plurality of lenses having the same or different optical power and a minimum of stress may be produced.

18. A method as claimed in claim 17, further comprising independently limiting a maximum distance that each said other mold moves away from said one mold at each said molding station to a maximum distance not exceeding the depth of a respective gate.

* * * * *